United States Patent [19]

van Zanten

[11] 4,391,126

[45] Jul. 5, 1983

[54] METHOD AND APPARATUS FOR DETECTING ENGINE KNOCK IN AN INTERNAL COMBUSTION ENGINE

[75] Inventor: Anton van Zanten, Ditzingen, Fed. Rep. of Germany

[73] Assignee: Robert Bosch GmbH, Stuttgart, Fed. Rep. of Germany

[21] Appl. No.: 267,892

[22] Filed: May 28, 1981

[30] Foreign Application Priority Data

Jun. 2, 1980 [DE] Fed. Rep. of Germany ....... 3020853

[51] Int. Cl.³ ............................................ G01L 23/22
[52] U.S. Cl. ...................................................... 73/35
[58] Field of Search .................... 73/35; 123/425, 435

[56] References Cited

U.S. PATENT DOCUMENTS 3,540,262 11/1970 Wostl et al. .
4,012,942 3/1977 Harned .
4,276,861 7/1981 Kearney et al. .................... 73/35 X

FOREIGN PATENT DOCUMENTS 2918420 5/1979 Fed. Rep. of Germany.

Primary Examiner—James J. Gill
Attorney, Agent, or Firm—Frishauf, Holtz, Goodman & Woodward

[57] ABSTRACT

The output signal of a mechanical engine knock sensor is supplied to two similar treatment branches through different input filters, one, for the main signal, which passes frequencies at which engine knock signals are known to occur and for a reference signal by a filter which passes only frequencies likely to contain few or no components of knock signals. If both signals show a sharp of rise occurring at the same time or with less than a predetermined time offset, the peak value of each signal is stored and utilized to weight inversely the amplification of the signal value during the declining phase following the peak. It has been discovered that engine knock signals fall off more slowly from a peak than other motor noises. Consequently, when the weighted signals are compared and show a consistent difference exceeding a predetermined threshold, an engine knock detection signal is produced.

8 Claims, 2 Drawing Figures

METHOD AND APPARATUS FOR DETECTING ENGINE KNOCK IN AN INTERNAL COMBUSTION ENGINE

This invention concerns the detection of engine knock by means of mechanical shock sensing on the engine block.

The occurrence of so-called "engine knock" under particular operating conditions of an internal combustion engine is a very well-known difficulty. By this phenomenon are understood the shock waves of the fuel-air mixture that produce vibrations of the motor that are evident as audio frequency oscillations, as well as otherwise. Since when the engine knocks there usually is a strong thermal loading of the combustion chamber side of the cylindrical and of the piston, which may result in erosion of the cylinder or piston material, efforts are made for basically avoiding knocking in engines, since permitting knocking to any great extent can lead to destruction of the engine.

Since, on the other hand, efforts are made to utilize the working range of the engine as widely as possible, a need has arisen for early and reliable detection of knocking in internal combustion engines.

In addition to the problem of providing suitable sensors for picking up signs of knocking, there is also the measurement technology problem of reliable and trouble-free reading out of the knock signal from the various vibrations of the engine that appear in the output of the sensor, in order to be able to control the operation of the engine with reference to a knock signal that is either "knock yes" or "knock no."

In U.S. Pat. No. 3,540,262, a knock detector is described in which the measured engine-knock signal is compared with a threshold value signal independent of the motor signal and a knock-detection signal is given when the measured signal exceeds the threshold value. This device has the disadvantage that there is no knock detection with reference to the background noise of the engine, but merely with reference to comparison with an external signal independent of the motor.

In U.S. Pat. No. 4,012,942, an engine-knock detector is described in which the knock signal is compared with a reference signal that is generated in a manner dependent upon the engine speed. This arrangement and method has the disadvantage, that, again, the background noise that actually occurs in the engine is not taken into consideration, but is merely simulated with a function generator. In such a case, particularly, no account is taken of the operating conditions of the engine at the moment, its particular settings or its age condition.

Finally, in German-published patent application No. P 29 18 420.1, it was proposed to supply the engine-knock signal that also contains the background noise of the engine to a comparator, both directly and through a low-pass filter. In this manner, the result is obtained of comparing the knock signal with the background noise of the engine as it appears during the most recent cycles of the motor.

THE INVENTION

It is an object of the present invention to provide a method of detecting engine knock by means of a mechanical sensor in a more reliable fashion and by means of more sophisticated criteria than have been used in the past.

Briefly, it has been discovered that an engine knock produces a signal wave having a trailing wave side that dies down more slowly than the trailing portions of signal waves produced by other engine noise. A reference signal is therefore produced by filtering the sensor output to pass a frequency range in which usually no knock noises occur and the resulting waves are then compared with the signals containing the frequencies of the range in which knock signals commonly occur, and the comparison is made strictly with reference to the rate of which the trailing portions of the wave following the wave peaks fall off in order to give a warning signal for further processing when a difference in trailing slope is found that exceeds a predetermined amount.

Preferably, the comparison is not made if the wave of the signal containing the knock frequencies trails the comparison wave by more than a predetermined interval and, likewise, if either of the two signals has a rate of rise in their leading portions that does not exceed a predetermined rate of rise.

Engine knock detection in accordance with the invention has been found to be substantially more reliable in recognizing a knock condition than the previously known systems utilizing mechanical sensors as the source of information.

THE DRAWING

The invention is further described by way of example of illustration with reference to the annexed drawings in which FIG. 1 is a graph of the time course of an engine-knock signal and a reference signal under comparison in accordance with the invention, and FIG. 2 is a block diagram of apparatus for carrying out engine-knock detection by means of a comparison such as that explained in connecton with FIG. 1.

DESCRIPTION OF THE ILLUSTRATED EMBODIMENT

For measuring engine knock, sensors are usually installed that pick up engine vibrations. These sensors are usually designed to respond to the known knock frequencies so that the occurrence of an oscillation in this frequency range is already a first indication for the occurrence of knocking. Since other vibrations (background noise) occurring in the ordinary operation of an internal combustion engine appear in a wide frequency range, there is no frequency range in which only the engine knock oscillations appear. It is a question therefore for every knock measurement to distinguish the actual useful signal (knock signal) from background noise.

Accordingly, for the purposes of the invention a reference signal is derived from the combined engine oscillations that lies in a frequency region in which hardly any or very few components engine knock waves or shocks appear, by conventional electrical filter techniques. If now the main signal is compared to the reference signal, it is possible to obtain a further cirterion for distinguishing the occurrence of knocking, by determining whether the main signal strongly exceeds the reference signal in peak value, again by known techniques.

Finally, it has been discovered, as above mentioned, that knock signals trail off in time more slowly than the normal engine vibrations and hence likewise more slowly than the waves of the reference signal. This phenomenon is utilized in the method and apparatus of the invention to provide a third criterion for the determination of whether engine knock is present, namely by comparison of the time-wise drop-off behavior of main and reference signals. For this purpose, the time course of main and reference signals is followed and, after a peak is passed, the drop-off behavior is measured in each case. If it then appears that the main signal falls off more slowly than the reference signal, a knock detection signal is produced.

Figure 1:
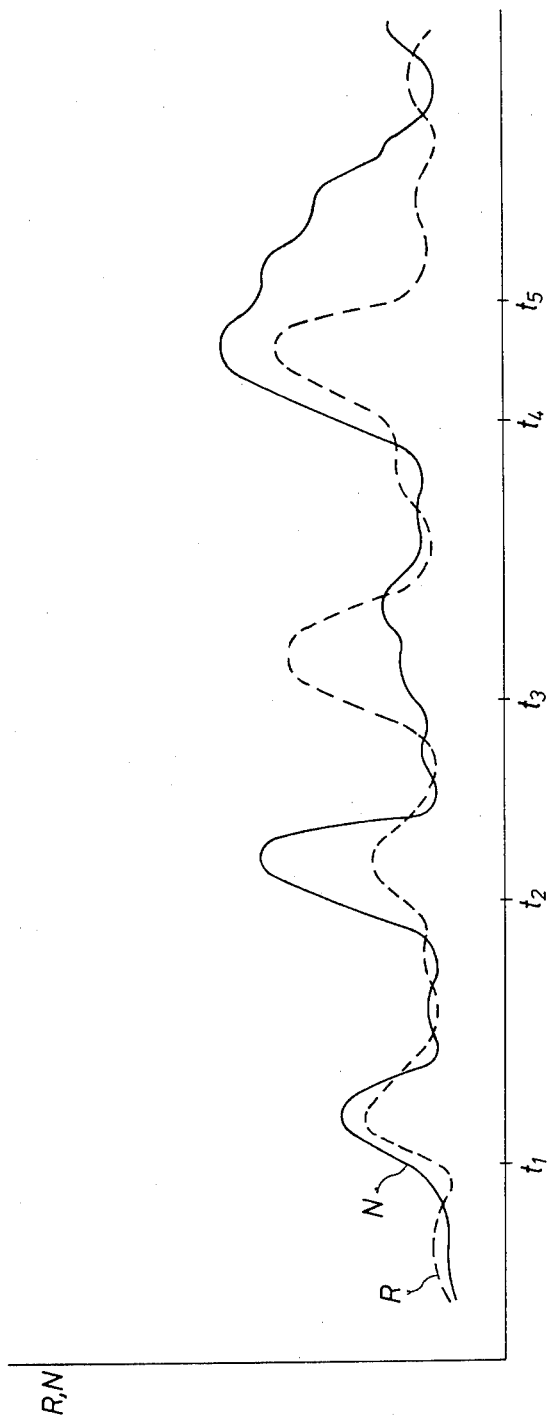

In order to show more clearly the method of the invention, there are shown in FIG. 1 the time course of a main signal N and of a reference signal R. According to the invention, the comparison of main and reference signals should made only in the drop-off or trailing phase following a previously reached maximum of the signals. Therefore, in the preferred embodiment of the method of the invention, the method should be begun only when both signals have previously risen sharply. In the signal waves illustrated by way of example in FIG. 1, at the moment $t_1$ both the main signal and the reference signal rise sharply and reach a maximum. Consequently, the measurement process is started, but in this case no detection signal is produced, since both signals fall off at about the same speed after passing their respective maxima.

At the moment $t_2$, the main signal N rises sharply, but the reference signal R does not. Consequently, in this case no measurement process is even begun. This holds likewise for the moment $t_3$, at which the reference signal R rises sharply, but in contrast the main signal N does not.

Only at the moment $t_4$, in which both signals rise sharply is again a measurement started, which in this case leads at the moment $t_5$ to the output of a knock detection signal, since after the passing of the respective maxima, the main signal N falls off substantially more slowly than the reference signal R. This is determined in accordance with the invention by comparing the signals with each other only in the falling off phase. Since the main signal N falls off more slowly than the reference signal R, it has a higher amplitude at all times during the falling off phase.

Figure 2:
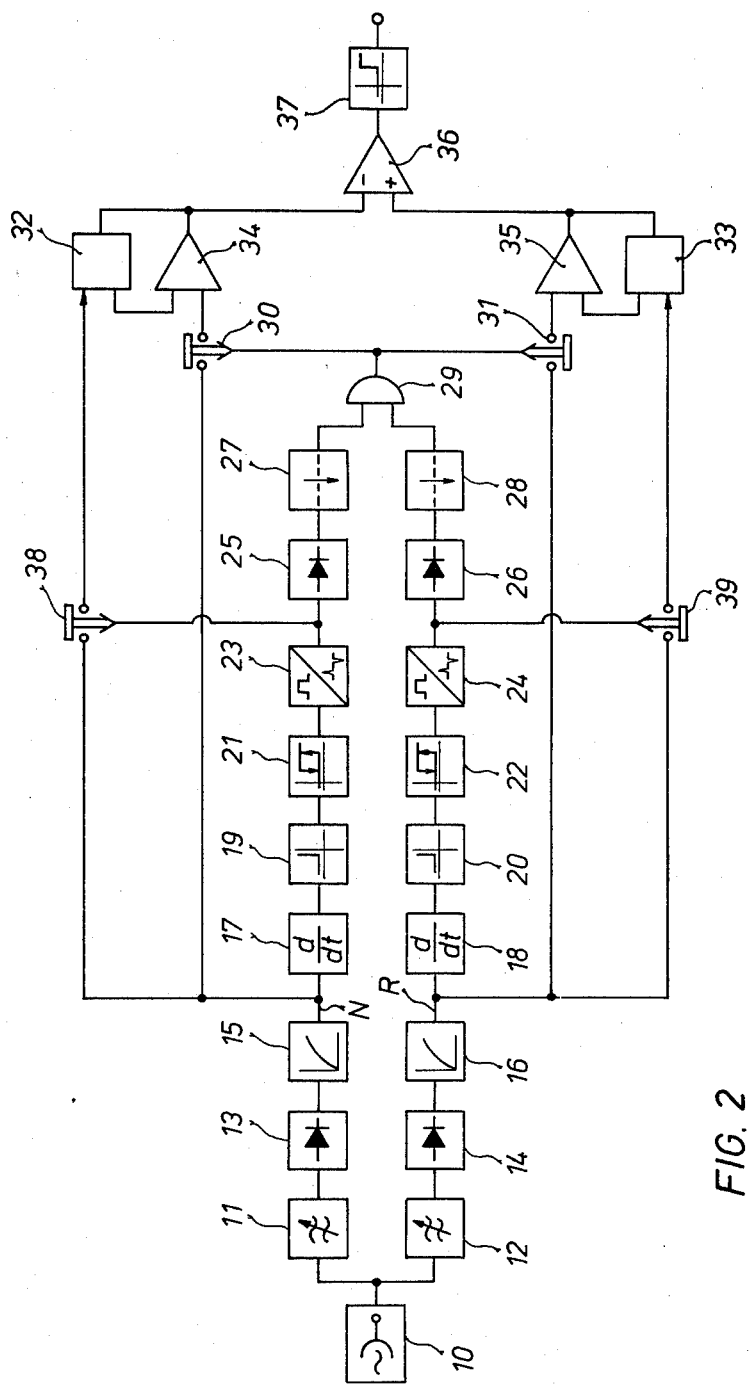

An embodiment of a device for carrying out the method just described is illustrated in FIG. 2. The engine signal sensor 10 is connected to two output branches, one for the main signal N and the other for the reference signal R. The two branches have basically the same constitution, except for the filter characteristics now to be mentioned. Each branch has a filter, which is followed by a rectifier and then by a smoothing stage or filter. The filter 11 in the main signal branch is a band filter so designed that the pass frequency range includes and is preferably more or less confined to a frequency at which particularly strong engine knock signals occur when the engine is caused to knock. In contrast to the filter 11, the filter 12 is so designed that its pass-band passes only signals in a frequency range in which normally no engine knock noises occur, so that the reference signal R corresponds to the background noise without knock components. The signals are then respectively rectified in the rectifiers 13 and 14 and smoothed in the circuits 15 and 16, which are R-C smoothing networks, so that at the outputs of the stages 15 and 16 there appear respectively the main signal N and the reference signal R.

These signals then pass through a series or cascade or processing circuits, differentiating stage 17,18, a characteristic modifying stage 19,20, a threshold switch 21,22 a pulse producer 23,24, a second rectifier 25,26 and finally a time stage 27,28, the operation of which is further described below.

The outputs of the stages 27 and 28 are supplied to an AND-gate 29. The switches 30 and 31 are actuated by the output of the AND-gate 29. These switches respectively enable the supply of the output signals of the smoothing stages 15 and 16 to the weighting stages 34 and 35. The weighting stages 34 and 35 consist essentially of an amplifier in the feedback circuit of which a sample-and-hold stage 32,33 is provided. The outputs of the weighting stages 34 and 35 are supplied to the inputs at a comparator 36, of which the output is supplied to a threshold value stage 37. The control inputs of the sample-and-hold stages 32 and 33 are respectively controlled by the switches 38 and 39 which in turn are controlled by the respective outputs of the pulse-forming circuits 23 and 24 to pass likewise the respective outputs of the smoothing stages 15 and 16, this time to the sample-and-hold circuits 32 and 33, which store a voltage, for example on a capacitor, and utilize that voltage to determine the value of a resistance, for example by means of a field effect transistor operated "below pinch-off" as, for example, described by W. Gosling in "Circuit Applications of Field Effect Transistors" Part III, British Communications and Electronics, December 1964, pp. 857–885, or as described in the copending application of Klaus Lehmann, Ser. No. 212,935, filed Dec. 4, 1980.

The manner of operation of the circuit of FIG. 2 is as follows:

The main signal is differentiated in the differentiating stage 17, of which the output goes to the characteristic modifying stage 19, which suppresses the negative signal gradients. The positive gradients proceed to the threshold switch 21, preferably a Schmitt trigger circuit having hysteresis, which switches over when the positive gradient signal exceeds a first threshold value to produce a positive output potential and switches back to zero potential only after the positive gradient signal drops below a lower threshold value, for example the value zero. The output pulses of the threshold switch 21 are then differentiated in the pulse-forming stage 23, so that there is produced a positive needle pulse for the positive-going edge of the threshold switch output and a negative needle pulse for the negative-going edge of the threshold switch output. The needle pulses are then supplied to the rectifier 25 which suppresses the negative pulses. The positive pulses then proceed to the setting input of the time stage 27, which is set only if the threshold switch 21 has switched to positive output potential, i.e. if the main signal N rises more rapidly than predetermined in the threshold switch 21. In other words, the threshold switch 21 operates only if its input signal reaches its upper threshold value, and whether it does so depends upon the steepness of the rise of the input to the differentiating circuit 17.

The reference signal R is similary processed by the circuits 18,20,22,24,26 and 28. The AND-gate then provides an output signal only when the main and reference signal both rise fast and do so at times sufficiently close together as determined by the time circuits 27 and 28, as described further below. When the AND-gate 29 operates, the switches 30 and 31, which will usually be semiconductor switches, are closed, and the main and reference signals are respectively supplied to the weighting stages 34 and 35. The weighting factor of the weighting stages 34 and 35 depends upon the feedback that determines the amplification factor of these amplifiers, which is in turn determined by the resistances provided in the respective feedback paths by the controlled resistances of the sample-and-hold circuits 32 and 33 respectively. The switches 38 and 29, which are likewise normally constituted as semiconductor switches, are so constituted as to close during a positive output pulse of the pulse formers 23 and 24, respectively, and to open again upon the occurrence of the following negative pulse. This means that in the case of sharp signal rise, when the threshold switch 21 or 22 operates, the main or reference signal, as the case may be, is supplied to the sample-and-hold stage 32 or 33 respectively. When, thereafter, the signal maximum is reached, the first time derivative of the signal wave and therefore the output signals of the differentiating stages 17 and 18 drop to zero and the respective threshold switches 21 and 22 are reset to their idle conditions. This has the result of producing negative pulses, respectively, at the outputs of the pulse formers 23 and 24, which re-open the respective switches 38 and 39. In this manner, the peak signal values of the main and reference signals are temporarily stored in the respective sample-and-hold stages 32 and 33 until upon the appearance of a renewed steep rise of one of the signals, the measuring operation is again started from the beginning. The influence of the peak value of the main or reference signal on the corresponding weighting is inversely proportional, i.e. the falling off main or reference signal is amplified the less, the greater the peak value of that signal was. In the comparator 36 there now occurs the comparison of the thus weighted signals in the trailing or falling off phase, and if the difference exceeds a predetermined value between the weighted main and reference signal, the threshold switch stage 37 produces a knock detection signal.

If it is now assumed that the main and reference signals of which the time course is shown in FIG. 1 appear at the respective outputs of the stages 15 and 16 of FIG. 2, the following behavior will result for these particular operational events in the circuit of FIG. 2:

at the moment $t_1$, both threshold switches 21 and 22 operate because of the steep rise of both signals and in consequence, the AND-gate 29 likewise operates and actuates the switches 30 and 31. In consequence, a comparison of main and reference signals, with the corresponding weighting then takes place in the comparator 36, this time producing no knock detection signal, because both signals fall off at about the same rate.

At the moment $t_2$, the threshold switch 21 operates, because the main signal N has risen sharply, but the threshold switch 22 does not operate, because the reference signal R has not so risen. In consequence, the AND-gate 29 likewise does not operate and neither of the switches 30 and 31 is operated. No comparison of the signals in the comparator 36 accordingly takes place. The converse case, namely steeply rising reference signal R and hardly or not rising main signal N leads to an analogous behavior at the moment $t_3$.

At the moment $t_4$, the switches 30 and 31 are operated for the reasons mentioned above and the weighted signals are compared with each other in the comparator 36. It is then found that during the declining phase a considerable difference in signal amplitudes appear, enough to cause the threshold stage 37 to respond and to produce an engine knock detection signal.

The time stages 27 and 28 are provided in order to permit response when the respective rises of the main and reference signals are slightly offset with respect to each other in time. These circuits can accordingly be constituted as fast monopulse circuits of suitable pulse length. By these fixed periods of the time stages, it is provided that no knock detection signal will be produced if the appearance times of the signal rises are too strongly offset from each other, for example if the main signal N appears later than the reference signal R by more than a predetermined interval. By setting of the respective turn-on periods of the time stages 27 and 28, the critical offsets between the rise times of the two signals can be set for one value when the main signal comes first and another value when the main signal comes later. The time stage which is last to operate determines the duration of the comparison operation.

Although the invention has been described with reference to a particular illustrative embodiment, it will be understood that modifications are possible within the inventive concept.

I claim:

1. Method for detection of knocking in an internal combustion engine comprising the steps of:
    detecting the wave shape of mechanical vibrations by a sensor responsive to engine vibrations both in a first frequency range within which engine knock vibrations commonly occur and in a second frequency range in which few, if any, components of engine vibratons commonly occur;
    separating the outputs of said sensor in said first and second frequency ranges to produce a main signal and a reference signal;
    initiating a comparison of said signals when both rise to a peak at approximately the same time;
    performing said comparison during an interval beginning substantially when the peaks of said signals have passed, in such a way as to provide an engine knock signal when said main signal falls off more slowly than said reference signal and thereby produces a comparison output exceeding a predetermined output value.

2. A method as defined in claim 1, in which the comparison of said signals during said interval is performed with weighting of the respective signals in inverse proportionality to the preceeding peak value of the respective signals.

3. A method as defined in claim 1 or claim 2, in which no said comparison is made if the said rise of said main signal trails said rise of said reference signal by more than a predetermined time lapse.

4. A method as defined in claim 3, in which, also, no said comparison is made if the rise of said reference signal trails the rise of said main signal by more than a predetermined time lapse.

5. A method as defined in claim 3, in which said comparison of said main and reference signals is performed only during a short time interval or predetermined length beginning when both said signals have risen at a rate exceeding a predetermined rise rate.

6. A method as defined in claim 1 or claim 2, in which said comparison of said main and reference signals is performed only during a short time interval of predetermined length begining when both said signals have risen at a rate exceeding a predetermined rise rate.

7. An apparatus for detecting engine knock in an internal combustion engine, for initiating counteraction of a knocking condition therein, comprising:
    sensor means connected to an engine structure for producing signals of a first frequency range likely to contain signals caused by engine knock and, also, signals of a second frequency range unlikely to contain signal components caused by engine knock;

means for separating the output of said sensor means into a main signal of frequencies in said first frequency range and a reference signal of frequencies in said second frequency range;

means for rectifying and smoothing both said main signal and said reference signal;

means for detecting a rate of signal rise in said rectified and smoothed main signal exceeding a predetermined rise rate value;

means for detecting a rate of signal rise in said rectified and reference signal exceeding a predetermined rise rate value;

coincidence circuit means responsive to the detection within a predetermined short time span of a rise rate of both said main signal and said reference signal exceeding the said respective rise rate values;

means responsive to said coincidence circuit means for producing a comparison of signals derived respectively from said rectified and smoothed main and reference signals for a test period extending after both signals have passed their peak values, and means for providing an engine knock recognition signal when the output of said comparison producing means over said test period exceeds a predetermined value in the sense corresponding to said main signal being greater than said reference signal.

8. Apparatus as defined in claim 7, in which means are provided responsive to said respective signal rectifying smoothing means for deriving signals respectively from rectified and smoothed main and reference signals which are weighted in magnitude in inverse proportion to the magnitude of the preceding peak of the same signal, and for supply of said derived signals to said comparison producing means.

* * * * *